US011355961B2

(12) United States Patent
Duan et al.

(10) Patent No.: US 11,355,961 B2
(45) Date of Patent: Jun. 7, 2022

(54) METHOD AND SYSTEM FOR FAST RECONFIGURATION OF POWER SUPPLY NETWORK IN TENS OF MILLISECONOS AFTER POWER GRID FAILURE

(71) Applicants: BEIJING SIFANG AUTOMATION CO., LTD., Beijing (CN); BEIJING SIFANG ENGINEERING CO., LTD., Beijing (CN)

(72) Inventors: Gang Duan, Beijing (CN); Xiaonan Lou, Beijing (CN); Qi Zhang, Beijing (CN); Yuhan Zhang, Beijing (CN); Nian Liu, Beijing (CN); Liangliang Zheng, Beijing (CN)

(73) Assignees: BEIJING SIFANG AUTOMATION CO., LTD., Beijing (CN); BEIJING SIFANG ENGINEERING CO., LTD., Beijing (CN)

( * ) Notice: Subject to any disclaimer, the term of this patent is extended or adjusted under 35 U.S.C. 154(b) by 5 days.

(21) Appl. No.: 16/945,611

(22) Filed: Jul. 31, 2020

(65) Prior Publication Data
US 2020/0412167 A1 Dec. 31, 2020

Related U.S. Application Data

(63) Continuation of application No. PCT/CN2019/090354, filed on Jun. 6, 2019.

(51) Int. Cl.
*H02J 13/00* (2006.01)

(52) U.S. Cl.
CPC .... *H02J 13/0004* (2020.01); *H02J 13/00002* (2020.01); *H02J 13/00007* (2020.01); *H02J 13/00016* (2020.01)

(58) Field of Classification Search
CPC .......... H02J 3/00; H02J 3/003; H02J 2203/20; H02J 3/38; H02J 3/008; G05B 13/048;
(Continued)

(56) References Cited

U.S. PATENT DOCUMENTS

| 4,302,750 A | * | 11/1981 | Wadhwani | .......... H02J 13/0086 |
| | | | | 340/12.32 |
| 7,751,166 B2 | * | 7/2010 | Stoupis | ............. H02J 13/00016 |
| | | | | 361/64 |

(Continued)

FOREIGN PATENT DOCUMENTS

| CN | 102184203 A | 9/2011 |
| CN | 102243280 A | 11/2011 |

(Continued)

OTHER PUBLICATIONS

Friend et al "Effect of Distribution Automation on Protective Relaying", 2014, pp. 36 downloaded from https://ieeexplore.ieee.org/document/6799002?source=IQplus (Year: 2014).*

(Continued)

*Primary Examiner* — Rocio Del Mar Perez-Velez
*Assistant Examiner* — Olvin Lopez Alvarez
(74) *Attorney, Agent, or Firm* — BakerHostetler

(57) ABSTRACT

The disclosure provides a method for fast reconfiguration of power supply grid in tens of milliseconds after power grid failure. The master station of fast reconfiguration of power grid concentrates the network status information from the client stations at transformer substations or power plants, and compares it with the built-in control strategy table which deals with possible faults. When an expected power gird disconnection fault is detected, the pre-start switch-on instruction is sent to the client stations with multiple breakers which can reconnect the grid. When the fault is cleared, the client stations shall identify the fault clearing time according to the local information, and send the instruction of synchronous switch-on to the corresponding local breakers which can reconnect the separated grids. At the same time, the master station independently monitors the removal (Continued)

of the fault, and sends the backup switch-on signal with synchronism check to the corresponding breakers which can reconnect the separated grids. Based on the above mechanism, the disconnected grid can be reconnected within 150 ms after disconnecting. After the interconnection of the grid is restored, the breakers that form the electromagnetic ring network switch off.

20 Claims, 4 Drawing Sheets

(58) Field of Classification Search
CPC .......... Y02E 60/00; Y04S 40/20; Y04S 50/10; Y04S 10/50
See application file for complete search history.

(56) References Cited

U.S. PATENT DOCUMENTS

| | | | |
|---|---|---|---|
| 2003/0185150 A1* | 10/2003 | Matsumoto | H04L 69/40 370/217 |
| 2008/0211511 A1* | 9/2008 | Choi | H02H 3/385 324/522 |
| 2010/0152910 A1* | 6/2010 | Taft | H02H 3/042 700/286 |
| 2017/0331274 A1* | 11/2017 | Akke | H02H 7/261 |
| 2019/0332073 A1* | 10/2019 | Nasle | G06Q 30/0206 |

FOREIGN PATENT DOCUMENTS

| | | |
|---|---|---|
| CN | 202759221 U | 2/2013 |
| CN | 106981875 A | 7/2017 |

OTHER PUBLICATIONS

Dantas et al, "Progressive Fault Isolation and Grid Restoration Strategy for MTDC Networks", 2018 pp. 909n-918n downloaded from https://ieeexplore.ieee.org/stamp/stamp.jsp?arnumber=8003498 (Year: 2018).*

International Patent Application No. PCT/CN2019/090354; Int'l Search Report; dated Feb. 28, 2020; 2 pages.

* cited by examiner

METHOD AND SYSTEM FOR FAST RECONFIGURATION OF POWER SUPPLY NETWORK IN TENS OF MILLISECONOS AFTER POWER GRID FAILURE

FIELD OF THE INVENTION

The present invention generally relates to the technical field of power grid control, and more particularly, to a method and system for rapid reconstruction of power supply network in tens of milliseconds after power grid failure.

BACKGROUND OF THE INVENTION

After the external network accident or internal network failure occurs in a regional power grid, due to the interruption of part of the power supply path, the whole regional power grid or part of the regional power grid may be islanded. When the loss of power supply accounts for a large proportion, or there is a large power difference between the power generation and load in the island, it is necessary to take generator tripping or load shedding measures to achieve the frequency stability of the islanded power grid. The measures will not only have a great impact on the production and power supply, but also make it difficult for the temporarily stable islanded power grid to keep continuous and stable running in the follow-up. Therefore, in order to ensure continuous and stable power supply, it is the most direct and effective measure to quickly reconstruct new power supply paths, restore the connectivity and integrity of the power grid, and form a power grid as large as possible.

If the terminal voltage of a motor is lower than 0.8 times the rated voltage and the duration exceeds 150 ms, the motor will be switched off by undervoltage protection. Therefore, the rapid power recovery after island formation should be completed within 100 ms. The existing power supply fast switching devices usually can start operation within 10 ms after some breakers disconnecting the power grid, and completes the power supply switching within 100 ms. However, the existing power supply fast switching device has the following disadvantages:

(1) The existing power supply fast switching device can only obtain the information of local bus or incoming line, and can't consider the recovery of power supply path from the perspective of the whole network, especially can't carry out multi-point switching based on the remote fault information, so it limits the alternative paths of recovering power supply and reduces the probability of restoring the connectivity and integrity of power grid.

(2) Conventional power supply fast switching devices rely on switch-off signal of breakers or related relay protection to start the switch-on operations. Therefore, when the fault occurs in the external power grid, and there is no switch-off signal in the monitoring area of conventional power supply fast switching device, the fast switching devices cannot be started; however, the frequency and voltage of the part of the internal power grid is collapsing, if the is part of the internal power grid cannot be isolated from the external power grid with fault, and be switched to the other part of the internal power grid with normal power supply sources, the loads in the part of the internal power grid affected by the external fault will stop running.

(3) The hot standby power source in a local area may not have enough capacity, so more hot standby power sources should be selected in the distance for support.

(4) A single power supply path can be overloaded, where multiple power supply paths are required.

(5) There is the possibility that the fast switching of power supply fails because the synchronous conditions do not meet the requirements. After the failure of a conventional fast switching of power supply with only one switch-on breaker, the reconnection of the isolated power grids fails without backup measures.

In addition, the existing methods known as power grid reconfiguration or power grid self-healing are all based on conventional slow switching operation, that is the power supply is resumed after a longtime power outage of loads, and loads have stopped continuous running. Therefore, such solutions cannot meet the requirement of restoring power supply within 150 ms after the removal of fault, and cannot achieve the purpose of restoring power supply without stopping the continuous running of loads, such as motors, so these methods of power supply restoring are not in the same scope as the problems solved by the invention.

SUMMARY OF THE INVENTION

In order to overcome the defects of existing power supply fast switching devices, this invention presents a method and system for fast reconfiguration of is power supply network in time of millisecond scale after power grid failure.

According to one aspect of the invention, a fast millisecond reconfiguration method for power supply network after power grid failure is provided, and the method includes the following characteristic steps:

Step 1: The master station of fast reconfiguration collects all the state information of the monitored power grid from the client stations of fast reconfiguration located in transformer substations or power plant, and compares it with the characteristics of built-in fault set that may occur, to judge whether the monitored power grid has breaker disconnection or the fault that will cause breaker disconnection, that is to say, real-time sense of grid disconnection fault;

Step 2: When the master station of fast reconfiguration detects a preset fault that may cause the breaker to switch-off, it sends pre-start switch-on instructions to the client stations of fast reconfiguration where the multiple networking recovery breakers corresponding to the class I breaker are located, in which the class I breaker is the breaker that may switch off;

Step 3: If the master station of fast reconfiguration detects the external network has been isolated and has been collapsing, the class II breaker will be switched off, and the instructions of synchronous switch-on will be sent to the client stations of fast reconfiguration where the multiple networking recovery breakers corresponding to the class II breaker are located, wherein the class II breaker is the tie breaker between internal network and external network;

Step 4: The client stations of fast reconfiguration receiving the pre-start switch-on instructions identify the fault clearing time in real time according to the local measurement information. When it is found that the fault is cleared or is being cleared, it will immediately or after delaying the designated time send the instructions of synchronous switch-on to the networking recovery breakers corresponding to the class I breaker;

Step 5: The master station of fast reconfiguration monitors the opening signal of the class I breaker in the monitored power grid. When it is found that one of the class I breakers has been switched off or being switched off, it will immediately or after delaying the designated time sends the back-up instructions of synchronous switch-on to multiple networking recovery breakers corresponding to the class I breakers;

Step 6: The implement of instruction of synchronous switch-on: check whether both sides of the networking recovery breaker to be switched on meet the synchronous switch-on condition and whether there is no fault blocking in the power outage area, and there is no fault blocking in the area of standby power source. If all the conditions are satisfied, the switch-on implementation signal will be sent to the networking recovery breaker;

Step 7: After the interconnection of the power grid is restored, disconnect the over-current networking recovery breaker or decrease the current with current limiting reactor;

Step 8: Uncouple the existing high and low voltage electromagnetic ring network;

Step 9: Reset the fast reconfiguration system of power supply network: after finishing step 8 for 200 ms, reset all devices of the fast reconfiguration system of power supply network, and return to step 1 to monitor the next power grid disconnection event.

According to another aspect of the invention, based on the above method, a system for fast reconfiguration of power supply network in tens of milliseconds after power grid failure is provided, which includes a fast reconfiguration master station and some fast reconfiguration client stations, wherein the master station is and the client stations are realized based on the hardware devices and platforms that meet the requirements of the national standards and the trade standards for the safety and stability control of the power system, and the hardware performance of the master station and the client stations meets the following conditions: The sampling rate of recorded data shall not be less than 1200 Hz, the processing period of data to get RMS values at client stations shall not be more than 0.83 ms, the information transmission period and instruction scanning period of master station and client stations shall not be more than 1.67 ms, the communication between devices in the system shall adopt 2M data special network, and the master station and client stations shall adopt hardwiring way to collect voltage and current measurement data from protection CT and PT respectively.

Technical Effects (1) Set up a strategic master station to concentrate key information of the whole network. The master station obtains equipment information of each power supply area of the whole network, identifies potential faults according to equipment information and network topology, and controls multiple breakers corresponding to the potential faults. According to the fast reconfiguration method of power supply network in the embodiment of the invention, the 10 ms scale fast recovery of power supply path can be realized from the perspective of the whole network: multiple circuit breakers corresponding to the identified potential faults are determined; when the potential fault really occurs, multiple breakers can be controlled to realize fast switching-on at multiple grid-connect nodes, improve the success rate of network restoration of the disconnected power grid, so as to realize the continuous operation of motors, auxiliary power supply devices and other loads without shutdown. Switch-on at multiple grid-connect is nodes also help to improve the success rate of power grid restoration by taking advantage of the different characteristics of different bus voltage variation process, which resulting in different switch-on synchronization conditions of each breaker; switch-on at multiple grid-connect nodes also reduce the possibility of overcurrent in the new power supply transfer paths.

(2) When the master station detects the potential fault that can cause the breaker to switch-off really occurs, it will send the pre-start instructions to the client stations of the relevant networking recovery breakers. The pre-started client stations will identify the clearing time of the remote fault according to the local measurement information, i.e. the switch-off time of the class I or II breakers, and then initiatively start the synchronous closing of local breakers to reconnect the isolated networks, so as to avoid relying on remote communication to start the synchronous closing of the breakers after the grid separation has occurred, then the remote communication time is saved.

(3) When the master station detects that the voltage of the lowest voltage bus has returned to normal value, it sends fast switch-on instructions to the client stations of the breakers at grid-connect nodes. In this way, if a client station fails to detect the recovery of local voltage, and fails to identify the clearing of remote fault, it can be remedied by the fast switch-on instruction or closing signal sent by the master station.

(4) The trip signal of protection or automatic device is used as the trigger signal of fast switch-on of breaker. By a certain delay, the breaker of the fault power grid is ensured to switch off first, and then the breaker of the standby power supply is switched on, so as to avoid the failure of switch-on due to the breaker of the fault power grid is not completely opened or switched off.

(5) When the external fault occurs at a distant location or the external power is grid is collapsing, the internal power grid monitored by the conventional power supply fast switching device has no switch actions, and the fast switching device cannot be started. However, the frequency and voltage of the whole power grid are collapsing. According to the method of the invention, the part of the internal power grid without fault can be isolated from the fault system in time, and switched to the normal power supply system, so as to ensure the stability and normal operation of the power grid.

(6) According to the method of the invention, when several breakers are successfully switched on and have formed an electromagnetic ring network, the electromagnetic ring network can be disconnected in time to make the grid operate stably.

Other features and aspects of the present invention will become clear according to the following detailed description of exemplary embodiments with reference to the accompanying drawings.

BRIEF DESCRIPTION OF THE DRAWINGS

The drawings included in and forming part of the specification together with the specification show exemplary embodiments, features, and aspects of the invention, and are used to explain the principles of the invention.

DETAILED DESCRIPTION OF THE PREFERRED EMBODIMENTS

Figure 1:
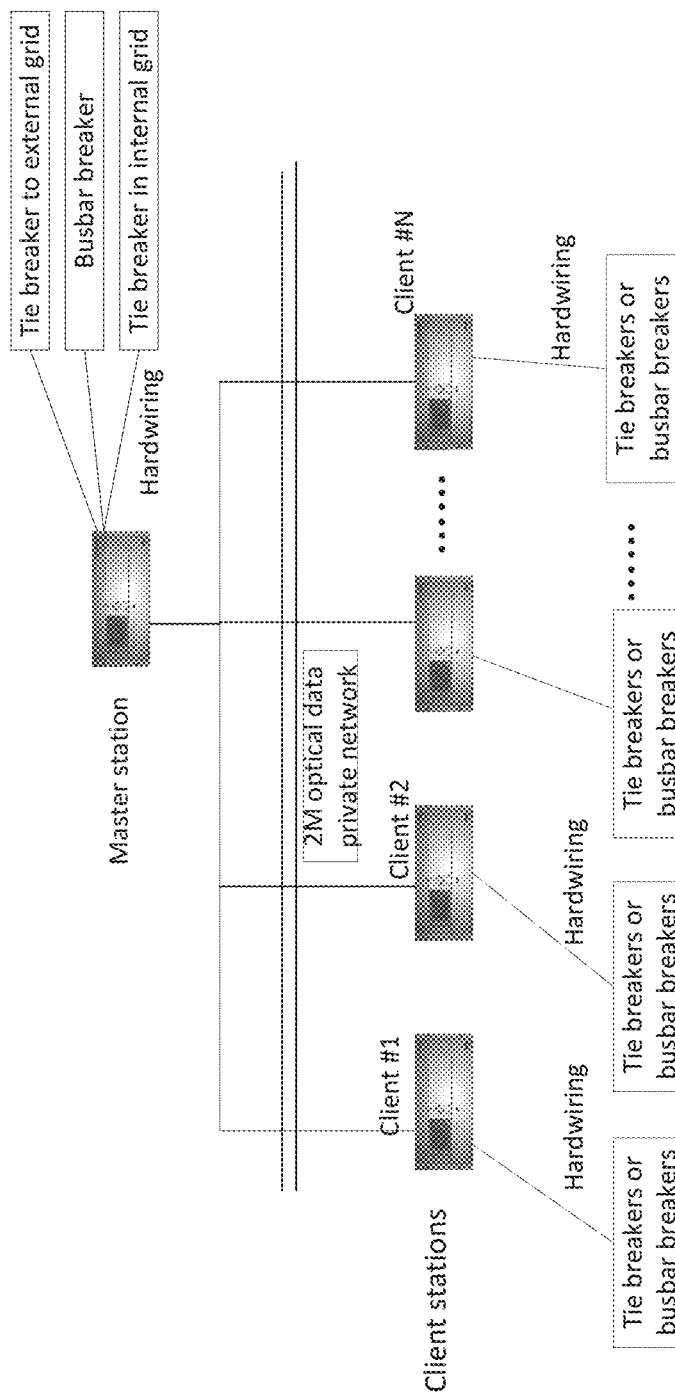
FIG. 1 shows the physical structure block diagram of the power supply network fast reconfiguration system according to an embodiment of the present invention.

Various exemplary embodiments, features and aspects of the invention will be described in detail below with reference to the appended drawings. The same reference symbols in the drawings indicate elements with the same or similar functions. Although various aspects of the embodiments are shown in the appended drawings, unless specifically noted, it is not necessary to draw the drawings to scale.

The word "exemplary" specially used herein means "to be used as an example, embodiment or illustrative". Any embodiments described herein as "exemplary" need not be interpreted as superior or better than other embodiments.

In addition, in order to better illustrate the invention, numerous specific details are given in the following specific embodiments. Technical personnel in the field should understand that the invention can be implemented without certain specific details. In some examples, the methods, means, elements and circuits well known to those technical personnel in the field are not described in detail to highlight the subject matter of the invention.

In order to solve the technical problems existing in the conventional fast switching device of power supply, the invention provides a fast reconfiguration method of power supply network after power grid failure. The fast reconfiguration method of power supply network after power grid failure in the embodiment of the invention can be applied to the fast reconfiguration system of power supply network.

FIG. 1 shows a physical structure block diagram of a fast reconfiguration is system of power supply network according to an embodiment of the present invention. As shown in FIG. 1, the fast reconfiguration system of power supply network (hereinafter referred to as the system) in the embodiment of the invention can include the fast reconfiguration master station (hereinafter referred to as the master station) and the fast reconfiguration client station (hereinafter referred to as the client station), wherein the master station and the client station can be realized based on the software and hardware platform of the power system security and stability control device conforming to the national standard and the industry standard. The performance of the hardware of the master station and the client station meets the following conditions: The sampling rate of the power frequency recording data of the client station shall not be less than 1200 Hz; the calculation and processing period of the measurement data of the client station shall not be more than 0.83 ms; both the information transmission period and the command scanning period of the master station and the client station shall not be more than 1.67 ms; the communication between the devices in the system shall adopt the 2M data special network; the master station and the client station shall adopt the hardwiring to collect the voltage and current from the protection CT (current transformer) and PT (potential transformer) respectively; the control signal of breaker is directly output to the actuator of the breaker through hardwiring.

In a possible way of realization, the master station can be set in the hub substation of a regional power grid. The master station is used to collect the equipment information of the whole network and make a centralized decision. The client stations can be set in the power substations or power plants in the regional power grid with the tie breakers connecting different power supply areas or bus coupler breakers. The client stations are responsible for collecting the is electrical state information of the equipment in the power substations or power plants, such as voltage and current. The client station is also responsible for implementing the instructions sent by the master station. The system of the embodiment of the invention can include a plurality of different client stations, which are respectively responsible for collecting the electrical state information of the equipment in the power substations or plants in different power supply areas.

In a possible way of realization, according to the analysis of the power grid, the operators can select and set the breakers that need to be monitored in advance, i.e. the class I breakers (breakers that are switched off by relay protection or stability control devices other than the fast reconfiguration system) and the class II breakers (breakers that are switched off by the fast reconfiguration system of power supply network), and the networking recovery breakers associated with class I and II breakers (i.e. the breaker that may be switched off); then the system can record the relationship between the class I & II breakers and their associated networking recovery breakers; when the system detects that a class I or II breaker is disconnected, it can obtain the associated networking recovery breakers according to the recorded relationship, and control the associated networking recovery breakers to switch on quickly. In another possible way of realization, the system can also conduct real-time network topology analysis of the power grid based on the breaker status in the master station, determine the class I & II breakers that need to be monitored and their associated networking recovery breakers, and control the action of the breakers according to the information monitored in real time.

Figure 2:
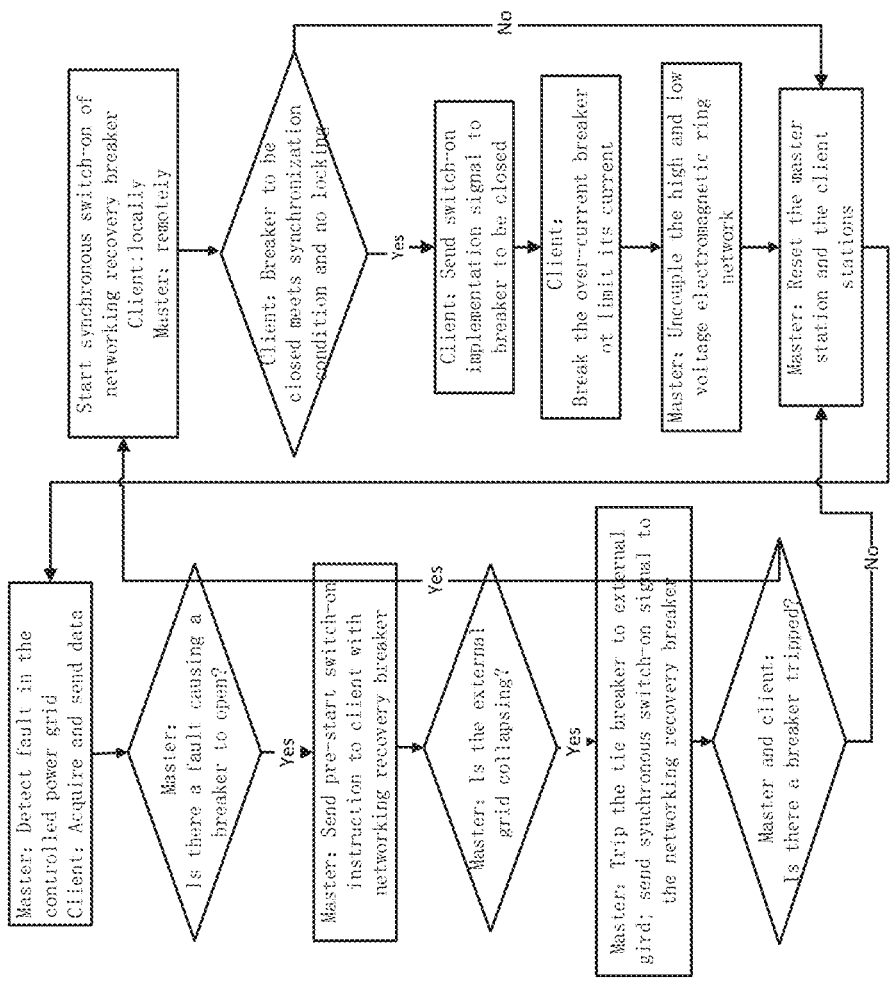
FIG. 2 illustrates the flow chart of the fast reconfiguration method of power supply network after a power grid failure according to an embodiment of the present invention.

FIG. 2 shows a flow chart of a fast reconfiguration method of power supply network after power grid failure according to an embodiment of the is invention, which can be applied to the master station and the client station in the system of FIG. 1, specifically including the following steps:

Step 1: The master station of fast reconfiguration collects all the state information of the monitored power grid (i.e. the controlled power grid) from the client stations of fast reconfiguration located in transformer substations or power plant, and compares it with the characteristics of built-in fault set that may occur, to judge whether the monitored power grid has breaker disconnection or the fault that will cause breaker disconnection, that is to say, real-time sense of grid disconnection fault;

The fast reconfiguration client station collects and measures the electrical information in the power substation or plant through hardwiring, transmits the measurement information and local decision-making information of the client station to the master station through network communication, and receives the pre-start switch-on instruction and synchronous switch-on instruction from the master station; the fast reconfiguration client station judges the tripping logic of the local breaker and the synchronous switch-on logic of the breaker, and control the breaker to trip or close by hardwiring.

The fast reconfiguration master station concentrates the information of the key equipments in the power grid measured by the client stations in the power substations or plants through the communication network, and makes the centralized analysis and decision, and then sends the active separation signals, the pre-start switch-on instructions and synchronous switch-on instructions to breakers or client stations. In addition, the master station also works as the fast reconfiguration client station of the local power substation or plant where the master station locates.

In the step 1, there are the following requirements for the information is acquisition and transmission of the fast reconfiguration master station and the client stations:

S2-1) Hardwiring is used to acquire electrical measurements of a substation or a plant in a fast reconfiguration client substation.

S2-2) The information and instructions between the fast reconfiguration master station and the fast reconfiguration client station are transmitted through network communication, for example, 2M communication network;

S2-3) The sampling rate of the power frequency recording data of the fast reconfiguration substation shall not be less than 1200 Hz;

S2-4) The data processing period of the fast reconfiguration client station is not more than 0.83 ms.

S2-5) The information transmission period and instruction scanning period between the fast reconfiguration master station and the fast reconfiguration client station are not more than 1.67 ms;

S2-6) The switching value inputs or digital inputs acquired by the fast reconfiguration client stations in transformer substations or power plants include: breaker position, trip signal of relay protection devices and trip signal of stability control devices;

S2-7) The analog inputs acquired by the fast reconfiguration client stations in transformer substations or power plants includes the voltages of critical buses, the currents and voltages of the branches of external power sources, transformers, generators, tie lines and bus couplers.

In the fast reconfiguration master station, according to the acquired power is grid information, it is determined whether there is or will be a fault that will cause the breaker to open, wherein the fault that will cause the breaker to open includes, but is not limited to the following faults:

S3-1) Short circuit fault;

S3-2) Over current fault;

S3-3) Power or voltage oscillation;

S3-4) Remote disconnection of external network to form isolated network.

Among them, short circuit fault, over current fault, power or voltage oscillation fault will trigger devices other than the fast reconfiguration system of power supply network to disconnect the corresponding class I breakers, which will cause the power grid to be separated and form an electrical island. After the separation, an island power grid without the original fault will appear. Devices other than the fast reconfiguration system of the power supply network include: relay protection devices, power grid stability control devices;

When the remote separation of the external network forms an isolated network, the rapid reconfiguration system of power supply network actively disconnects the monitored power grid and the external network at the tie line breaker, that is, the class II breaker, and the monitored power grid forms a new isolated electrical island.

Step 2: When the master station of fast reconfiguration detects a preset fault that may cause a breaker to switch-off, it sends pre-start switch-on instructions to the client stations of fast reconfiguration where the multiple networking recovery is breakers corresponding to the class I breaker are located, in which the class I breaker is the breaker that may be triggered to switch off by the preset fault;

In the step 2, the way to monitor pre-set faults that may cause breakers to switch off is as follows:

S4-1) The master station of fast reconfiguration evaluates the voltages of all the buses of the monitored power grid in real time. When the lowest bus voltage is lower than the first voltage threshold and lasts for a time period longer than the first time threshold, the bus corresponding to the lowest bus voltage is selected as the fault bus; in the invention, the first voltage threshold is preferably set to 0.5 times the rated voltage, and the first time threshold is preferably set to 10 ms;

S4-2) According to the current of each branch connected to the fault bus, the branch with the largest current is selected as the fault branch, and the breaker close to the fault bus on the fault branch is selected as the class I breaker;

S4-3) If the fault occurs at the fault bus, the method of S4-2) is still used to determine a class I breaker.

In this invention, the networking recovery breaker has the following characteristics:

S5-1) The networking recovery breaker reconnects the isolated power grid with other power grids through the switch-on operation;

S5-2) After the networking recovery breaker is switched on, the overcurrent protection should not be triggered to act in the time period of the second time threshold; in the invention, the second time threshold is preferably set to 20 s;

S5-3) If there are more than one networking recovery breakers for an electrical island formed by a class I or class II breaker, and these networking recovery breakers belong to three or more voltage levels, only the networking recovery breakers at the highest two voltage levels are reserved;

S5-4) Each networking recovery breaker belongs to a fast reconfiguration client station, and the instructions sent by the master station to the networking recovery breaker are forwarded by the fast reconfiguration client station.

Figure 3:
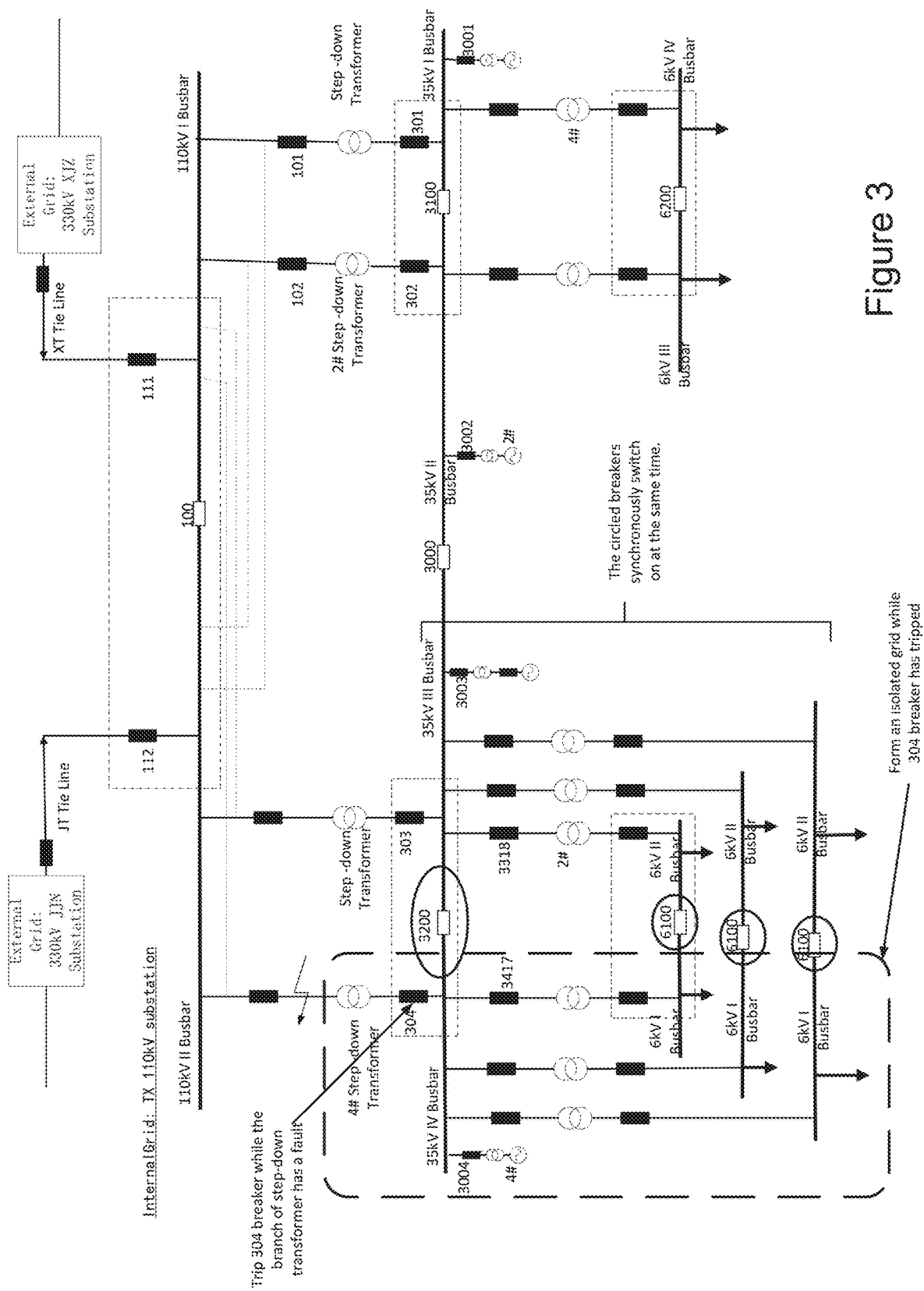
FIG. 3 illustrates the schematic diagram of fast reconfiguration of the power supply network in case of internal failure of the regional power grid.

FIG. 3 shows a schematic diagram of fast reconfiguration of power supply network in case of internal fault of a regional power grid. As shown in FIG. 3, the branch of 4 # step-down transformer has a fault, and the relay protection has tripped No. 304 breaker; according to the method of the invention, the following networking recovery breakers should be selected to synchronously switch on: No. 3200 bus coupler of 35 kV, and three No. 6100 bus couplers of 6 kV. Because the bus coupler of 6 kV is farther away from the fault than the bus coupler of 35 kV, and has a large number of motor loads, the phase angle difference between the two buses of the bus coupler of 6 kV is usually less than that between the two buses of the coupler of 35 kV, and the success rate of synchronous switch-on of the bus coupler of 6 kV is higher. In addition, the reason for selecting three bus couplers of 6 kV to synchronously switch on at the same time is that when No. 3200 bus coupler cannot synchronously switch on successful, if only one 6 kV bus coupler is used to realize fast switch-on, for example, one No. 6100 breaker is switched on, then the Section III of 35 kV bus will supply power to the three groups of loads of Section IV of 35 kV bus through 2 #35 kV/6 kV transformer, and the transformer may be overloaded. Therefore, the possibility of overload of each 35 kV/6 kV transformer can be reduced by using three 6 kV bus couplers to participate in the fast synchronous switch-on at the same time.

In fact, due to the difference of motor load or generator at difference bus, and the different distances between difference bus and the fault point, the variations of voltage amplitudes and phase angles of different buses are also very is different. Even though in one pair of buses of a breaker, the condition of fast synchronous switch-on is not satisfied, in other pair of buses of breakers, the conditions of fast synchronous switch-on are likely to be satisfied. Therefore, the synchronous switch-on at different bus couplers at the same time can improve the success rate of switching to standby power source.

Step 3: If the master station of fast reconfiguration detects the external network has been isolated and has been collapsing, the class II breaker will be switched off, and the instructions of synchronous switch-on will be sent to the client stations of fast reconfiguration where the multiple networking recovery breakers corresponding to the class II breaker are located, wherein the class II breaker is the tie breaker between internal network and external network;

In the step 3, all of the following criteria need to be met simultaneously to determine whether the external grid has been isolated and has been collapsing:

S6-1) The frequency deviation of the bus connected by the tie line of the external grid from the rated frequency (50 Hz) exceeds the first frequency deviation threshold; in this invention, the first frequency deviation threshold is preferably set to 0.1 Hz;

S6-2) The frequency deviation between the bus connected by the tie line of the external power grid and the bus of the standby power source exceeds the second frequency deviation threshold; in this invention, the second frequency deviation threshold is preferably set to 0.2 Hz;

S6-3) The frequency of standby power bus is within the first frequency range; in this invention, the first frequency range is preferably set to 49 Hz~51 Hz;

S6-4) The frequency change rate of the bus connected by the tie line of the external power grid exceeds the first frequency change rate threshold; in this invention, the first frequency change rate threshold is preferably set to 0.2 Hz/s;

S6-5) All the above conditions are met, and the duration is greater than the time period of the third time threshold; in this invention, the third time threshold is preferably set to 150 ms.

In the step 3, when the fast reconfiguration master station detects that the external network been isolated and has been collapsing, it sends the following instructions:

S8-1) Send switch-off signal to the external interconnection breaker, i.e. class II breaker;

S8-2) After a delay of 5 ms, send the instructions of synchronous switch-on to the client stations where multiple networking recovery breakers corresponding to the class II breaker are located.

The requirements of step 3 for the networking recovery breaker are the same as step 2

In case of remote external fault (external grid collapse) in the power grid, the area monitored by the conventional fast switching device of power supply has no tripping action of breakers, and the fast switching device cannot be started, but the frequency and voltage of the internal power grid are collapsing because of the collapsing external power grid. According to the fast reconfiguration method of power supply network in this embodiment of the invention, the internal power grid can be isolated from the collapsing external power grid in time and switched to a standby power source to ensure the stability and normal operation of the internal power grid.

Figure 4:
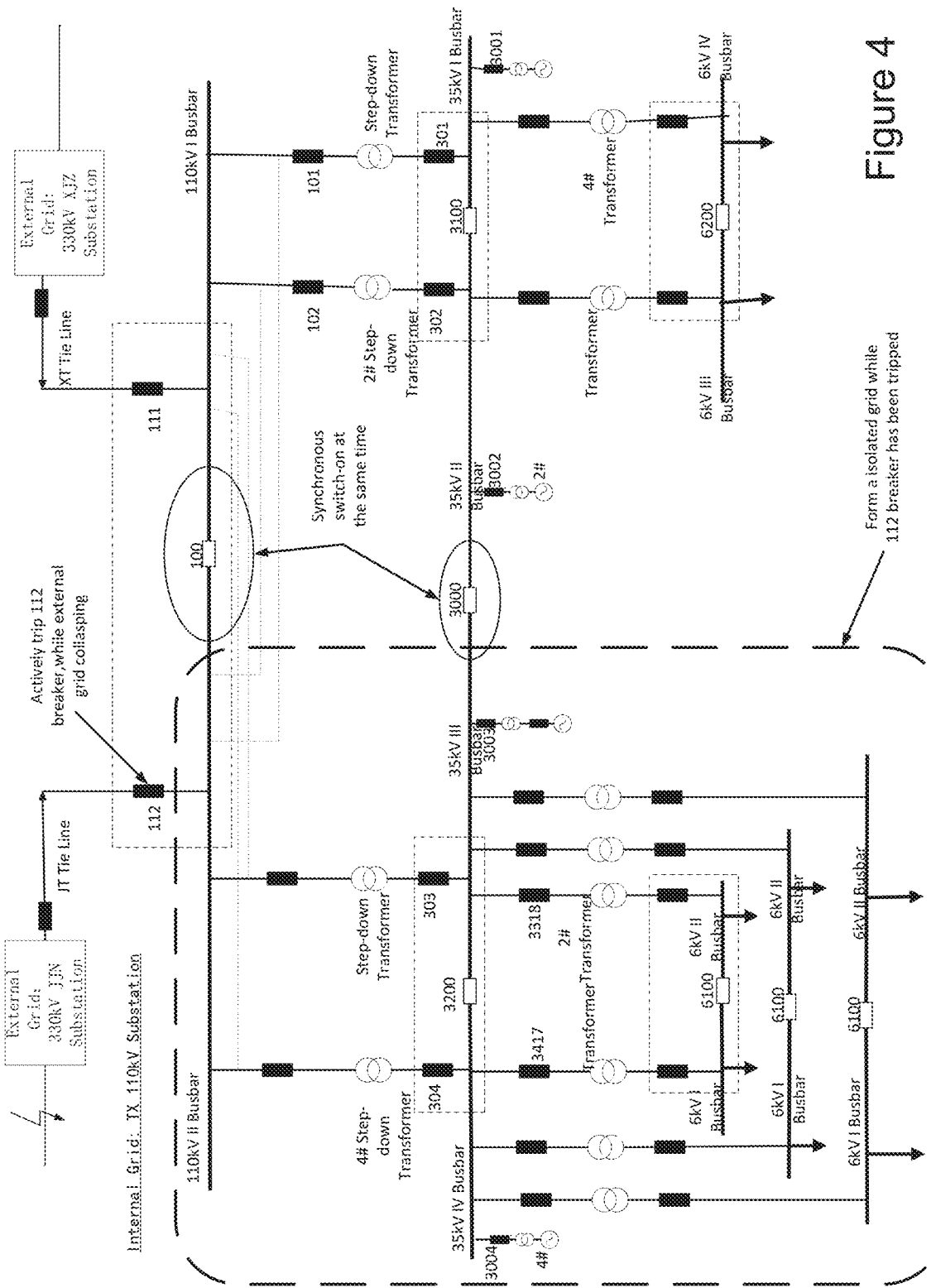
FIG. 4 illustrates a schematic diagram of fast reconfiguration of the power supply network in case of remote separation of the external power gird.

FIG. 4 shows the schematic diagram of the fast reconfiguration of power supply network in case of remote separation of the external power grid. As shown in FIG. 4, the remote external fault far beyond JJN substation makes the remote breaker trip, leading to the separation of the external network including JJN is substation from a larger power grid, forming an isolated power grid including the internal power grid and JJN substation. However, because the No. 112 breaker is not disconnected, the conventional power supply fast switching device cannot be started, and the isolated power grid cannot be reconnected to the normal power grid with standby external power supply from XJZ substation through the fast switch-on of No. 100 breaker. The method of the invention can actively disconnect No. 112 breaker when it has been detected that the external network from JJN substation has been isolated. This actively disconnect will trigger the fast switching of power supply, and then the No. 100 bus coupler of 110 kV voltage level and No. 3000 bus coupler of 35 kV voltage level will be selected to synchronously switch on at the same time, so that the isolated internal power grid can be reconnected to the normal power grid with standby external power supply from XJZ substation. Since the power supply switching can be completed within 150 ms, the isolated power grid can be reenergized by the standby power source while the loads keep continuous running Both simulation and actual measurement show that in the case of external network fault, at the same time, because the 110 kV bus coupler is close to the fault, the phase angle difference between the two bus voltages of the 110 kV breaker is usually greater than that between the two bus voltages of the 35 kV breaker, so the probability of successful synchronous switch-on of No. 3000 breaker is higher than that of No. 100 breaker.

Step 4: The client stations of fast reconfiguration receiving the pre-start switch-on instructions identify the fault clearing time in real time according to the local measurement information. When it is found that the fault is cleared or is being cleared, it will immediately or after delaying the designated time send the instructions of synchronous switch-on to the networking recovery breakers is corresponding to the class I breaker. The fault and the class I breaker here are not limited to the power substation or plant where this fast reconfiguration client station is located, but also include the fault and the class I breaker of other remote power substations or plants.

In the step 4, the fast reconfiguration client station receiving the pre-start switch-on instruction adopts the following methods to identify that the fault is cleared or is being cleared, then sends the instruction of synchronous switch-on to the corresponding networking recovery breaker in the same power substation as the one where the fast reconfiguration client station is deployed:

S10-1) If the fast reconfiguration client station is in the same power substation or plant as the class I breaker, the fast reconfiguration client station directly receives the trip signal of the class I breaker through hardwiring. When receiving the trip signal, the fast reconfiguration client station immediately sends the instruction of synchronous switch-on to the corresponding networking recovery breaker of the class I breaker;

S10-2) If the fast reconfiguration client station is in the same power substation or plant as the class I breaker, the fast reconfiguration client station directly receives the trip signal sent by the relay protection device or stability control device related to the class I breaker through hardwiring; when the trip signal is received, the fast reconfiguration client station delays the time period of the fourth time threshold to send the instruction of synchronous switch-on to the corresponding networking recovery breaker of the class I breaker; In this invention the fourth time threshold is preferably set to 5 ms.

S10-3) If the fast reconfiguration client station is not in the same power substation or plant as the class I breaker, the fast reconfiguration client station judges the time when the fault is cleared by monitoring the voltage status at both is ends of the breaker receiving the pre-start switch-on instruction in the substation or plant; when the fault is judged to be cleared, the fast reconfiguration client station immediately sends the instruction of synchronous switch-on to the corresponding networking recovery breaker of the first type breaker.

In the S10-3, the following method is used to identify the time when the fault is cleared:

S11-1) The bus voltage $U_y$ at the lower side of the two buses connected by the breaker receiving the pre-start switch-on instruction is monitored in real time by the fast reconfiguration client station;

S11-2) When $U_y$ is greater than 0.9 times of rated voltage or $U_y$ rises more than 0.1 times of rated voltage within 20 ms, it is considered that the fault has been cleared, and the time is recorded as the time when the fault is cleared.

In this invention, in the S10-1) and S10-3), the "immediately" here means the delay shall not exceed 5 ms compared with the time when the fast reconfiguration client station receives the switch-off signal of class I breaker.

For the case of FIG. 3, when 4 # step-down transformer branch occurs short circuit fault, the fast reconfiguration master station of 110 kV/35 kV power substation triggers the fast reconfiguration client stations in 35 kV/6 kV power substations to monitor the move of fault in advance. When the client station detects that the voltage of section I of 6 kV voltage level is recovered, it means that the No. 304 breaker has been tripped by relay protection and the fault has been isolated, so the operation of fast switch-on of the tie breaker of 6 kV buses can be carried out without waiting for the switch-on instruction from the master station, which will save a few milliseconds of communication time, and is conducive to the satisfaction of synchronous switch-on conditions in the subsequent step 6.

Step 5: The master station of fast reconfiguration monitors the opening signal of the class I breaker in the monitored power grid. When it is found that one of the class I breakers has been switched off or being switched off, it will immediately or after delaying the designated time sends the back-up instructions of synchronous switch-on to multiple networking recovery breakers corresponding to the class I breakers, the detailed method is as follows:

S12-1) In the scope of the whole monitored power grid, through the communication network, the fast reconfiguration master station receives in real time from the fast reconfiguration client station the switch-off signal of class I breaker, or the switch-off signal of the relay protection device or stability control device associated with the class I breaker;

S12-2) In the scope of the power substation or plant where the fast reconfiguration master station located, through hard wiring, the fast reconfiguration master station receives in real time the switch-off signal of class I breaker or the switch-off signal of the relay protection device or stability control device associated with class I breaker in the same power substation or plant;

S12-3) When the fast reconfiguration master station detects the disconnection of a class I breaker, it immediately sends the instructions of synchronous switch-on to the fast reconfiguration client stations of multiple networking recovery breakers related to the class I breaker through the communication network. These networking recovery breakers can belong to different fast reconfiguration client stations or power substations or plants;

S12-4) When the fast reconfiguration master station detects that a relay protection device or stability control device sends a switch-off signal to a class I breaker, it will delay the time period of the fourth time threshold to send instructions of synchronous switch-on to the fast reconfiguration client stations of multiple networking recovery breakers related to the class I breaker through the communication network. These networking recovery breakers can belong to different fast reconfiguration client stations or power substation or plant; In this invention the fourth time threshold is preferably set to 5 ms.

When the switch-off signal of a relay protection device or stability control device is used as the trigger signal of the instruction of synchronous switch-on, it is ensured that the breaker of the faulty power grid is switched off first to move the fault, and then the breaker of the standby power source is switched on followingly through a certain delay to avoid that the breaker of the faulty power grid is not completely disconnected, which will result in that the standby power source is switched on to the fault and the fault range is expanded.

S12-5) When the fast reconfiguration client station has sent out the instruction of synchronous switch-on, and the instruction has been executed, the instruction of synchronous switch-on from the fast reconfiguration master station is ignored; otherwise, the instruction of synchronous switch-on from fast reconfiguration master station is executed. That is to say, the instruction of synchronous switch-on from fast reconfiguration master station is the backup one of the instructions of synchronous switch-on from the fast reconfiguration client station.

In this invention, in the S12-3), the "immediately" here means the delay shall not exceed 5ins compared with the time when the fast reconfiguration master station receives the switch-off signal of class I breaker.

For example, when the fast reconfiguration master station receives the following signals, it sends the fast switch-on instructions to the control client is stations of the associated networking recovery breakers through the corresponding setting delay as follows:

(5.1) The fast reconfiguration master station receives trip signal of breaker in the local power substation or plant, then it sends the fast switch-on instructions to client stations without delay;

(5.2) The fast reconfiguration master station receives the trip signal sent by the relay protection or stability control device associated with the breaker in the local power substation or plant or the trip signal sent by the active separation module of the fast reconfiguration master station, then it sends the fast switch-on instructions to client stations with a delay of 5 ms;

(5.3) The fast reconfiguration master station receives the trip signal of breaker in the remote power substation or plant, then it sends the fast switch-on instructions to client stations without delay;

(5.4) The fast reconfiguration master station receives the trip signal sent by the relay protection or stability control device associated with the breaker in the remote power substation or plant, then it sends the fast switch-on instructions to client stations with a delay of 5 ms.

When receiving the following signals, the fast reconfiguration client station sends the synchronous switch-on instruction to the implementation module of the client station of the associated networking recovery breaker through the following corresponding setting delay:

(5.5) The fast reconfiguration client station receives fast switch-on instruction sent by the master station, then it sends the synchronous switch-on instruction to the implementation module without delay;

(5.6) The fast reconfiguration client station receives the trip signal of the is breaker in the local power substation or plant, then it sends the synchronous switch-on instruction to the implementation module without delay;

(5.7) The fast reconfiguration client station receives the trip signal sent by the relay protection or stability control device associated with the breaker in the local power substation or plant, or the breaker trip signal sent by the active separation module of the fast reconfiguration master station, then it sends the synchronous switch-on instruction to the implementation module with a delay of 5 ms;

(5.8) If the fast reconfiguration client station receives the pre-start switch-on instruction for a breaker in step 3, it starts to monitor the bus voltage at the lower side of the two buses connected by the breaker in real time. When it is found that the bus voltage is greater than 0.9 times of rated voltage or rises more than 0.1 times of rated voltage within 20 ms, then the client station sends the synchronous switch-on instruction to the implementation module without delay.

It takes tens of milliseconds for a breaker to be completely disconnected, therefore when the trigger of the instruction of synchronous switch-on for a networking recovery breaker is from the breaker trip signal of a relay protection or stability control device, then the client station sends the synchronous switch-on instruction to the implementation module with a certain delay so that the breaker in the fault grid can be disconnected first and the breaker for the standby power source can be closed followingly.

For the case of FIG. 3, when the branch of 4# step-down transformer occurs short circuit fault, the fast reconfiguration master station in 110 kV/35 kV power substation triggers the fast reconfiguration client station located in 35 kV/6 kV power distribution substation in advance. When the client station fails to detect the tripping of No. 304 breaker, the synchronous switch-on instruction sent by the master station remotely will be used as the backup remedial measure.

Step 6: The implement of instruction of synchronous switch-on: check whether both sides of the networking recovery breaker to be switched on meet the synchronous switch-on condition and whether there is no fault blocking in the power outage area, and there is no fault blocking in the area of standby power source. If all the conditions are satisfied, the switch-on implementation signal will be sent to the networking recovery breaker;

In the step 6, the synchronous switch-on condition of networking recovery breaker is to meet the following requirements at the same time:

S15-1) The angle difference between the two voltage phasors at two sides of the networking recovery breaker <20°;

S15-2) The frequency difference between the two sides of the networking recovery breaker is less than 1 Hz;

S15-3) The voltage amplitude difference between two sides of the networking recovery breaker is less than 0.2 times of the rated voltage.

In the step 6, the fault blocking in the power outage area related to the one side of networking recovery breaker will be set to true when one of the following conditions is satisfied:

S16-1) There is a bus whose three phase voltages are less than 0.7 times the rated voltage in the power outage area;

S16-2) There is a bus, among the three phase voltages of which, the difference between the maximum and minimum amplitudes of voltages is greater than 30% of the rated voltage in the power outage area.

In the step 6, the fault blocking in the area of standby power source will be set to true when the node voltage and frequency of the networking recovery breaker on the side of the standby power source meet any of the following is conditions:

S17-1) The phase voltage is outside the range of 0.85~1.2 times of the rated value;

S17-2) The frequency is outside the range of 49.2 Hz~50.8 Hz.

Step 7: After the interconnection of the power grid is restored, disconnect the over-current networking recovery breaker or decrease the current with current limiting reactor, and the method is as follows: if the current through the breaker after the networking breaker is switched on exceeds the allowable current threshold and lasts for the time period more than the fifth time threshold, then switch off the breaker or trigger the corresponding fast breaker to enter the high impedance state; in this invention the fifth time threshold is preferably set to 100 ms.

The over-current breaking of the networking recovery breakers can be realized in the device of the fast reconfiguration client station. If the over-current limiting scheme is adopted, a fast breaker needs to be used. When the current of the fast breaker is greater than a certain fixed value, the reactance of the fast breaker changes from 0 to a large value, so as to limit the current.

Step 8: Uncouple the existing high and low voltage electromagnetic ring network, and the method is as follows:

19-1) After the switch-on implementation signal is sent out in step 6, if the class I breaker or the class II breaker that should has been tripped is still in the closing state and last for the time period of the sixth time threshold, the switch-off signal is sent to these breakers; in this invention the sixth time is preferably set to 150 ms;

19-2) After the switch-on implementation signal is sent out in step 6, if the networking recovery breaker at higher voltage level is in the success state of switch-on and lasts for the time period of the sixth time threshold, the switch-off signals will be sent to all the networking recovery breakers with the success state of switch-on at lower voltage levels; in this invention the sixth time is preferably set to 150 ms;

It should be pointed out that the above selected breakers to be switched off can be exempted from being switched off if the following conditions are met. The selection of the breakers that can exempted from being switched off can be realized by offline setting or by online topology analysis;

19-3) If the trip of the breaker at lower voltage level reduces the access amount of external standby power source, the breaker at lower voltage level will not be switched off;

19-4) If there is only one single power supply path from the external power source at high voltage level, and it is impossible to form a high and low voltage electromagnetic loop network where the power from the external network at higher voltage level passes through the internal network at lower voltage level.

For the case of FIG. 3, after the switch-on implementation signal is sent, if it is detected that No. 3200 breaker of 35 kV voltage level is successfully closed and lasts for 150 ms, then the three No. 6100 breakers of 6 kV voltage level will be switched off.

For the case of FIG. 4, after the switch-on implementation signal is sent, if it is detected that No. 100 breaker of 110 kV voltage level is successfully closed and lasts for 150 ms, then No. 3000 breaker of 35 kV voltage level will be switched off.

Step 9: Reset the fast reconfiguration system of power supply network: after finishing step 8 for 200 ms, reset all devices of the fast reconfiguration system of power supply network, and return to step 1 to monitor the next power grid is disconnection event.

By the above method of the invention, when a grid is separated, the isolated part without enough power source can be reconnected to a grid with standby power source within 150 ms at most, so as to ensure the motors in the area where the power supply is temporally interrupted can keep continuous running without stop until the power supply is restored.

Various embodiments of the invention have been described above. The above description is exemplary, not exhaustive, and not limited to the disclosed embodiments. Without departing from the scope and spirit of the described embodiments, many modifications and changes are obvious to the ordinary technicians in the technical field. The choice of terms used herein is intended to best explain the principle, practical application or improvement of technology in the market of each embodiment, or to enable other ordinary technicians in the technical field to understand each embodiment disclosed herein.

What is claimed is:

1. A fast reconfiguration method of power supply network in tens of milliseconds after power grid failure, comprising the following characteristic steps:
   Step 1: a master station of fast reconfiguration collects all state information of a monitored power grid from client stations of fast reconfiguration located in transformer substations or a power plant, and compares it with characteristics of a set of possible faults to determine whether the monitored power grid has a breaker disconnection;
   Step 2: based on determining that the master station of fast reconfiguration detects a preset fault that causes a breaker to switch-off, the master station sends pre-start switch-on instructions to the client stations of fast reconfiguration where networking recovery breakers corresponding to a class I breaker are located, wherein the class I breaker is a breaker that may be triggered to switch off by the preset fault;
   Step 3: based on determining that the master station of fast reconfiguration detects that an external network has been isolated and has been collapsing, a class II breaker is switched off, and instructions of synchronous switch-on are sent to the client stations of fast reconfiguration where networking recovery breakers corresponding to the class II breaker are located, wherein the class II breaker is a tie breaker between an internal network and the external network;
   Step 4: the client stations of fast reconfiguration receiving the pre-start switch-on instructions identify a fault clearing time in real time according to local measurement information, and based on determining that the fault is cleared or is being cleared, immediately or after delaying a designated time, sending the instructions of synchronous switch-on to the networking recovery breakers corresponding to the class I breaker;
   Step 5: the master station of fast reconfiguration monitors an opening signal of the class I breaker in the monitored power grid, and based on determining that one of the class I breakers has been switched off or being switched off, the master station immediately or after delaying a designated time sends the instructions of synchronous switch-on to the networking recovery breakers corresponding to the class I breaker;
   Step 6: wherein execution of the instructions of synchronous switch-on comprises: determining that two sides of a networking recovery breaker to be switched on meet a synchronous switch-on condition, determining that there is no fault blocking in a power outage area, determining there is no fault blocking in an area of standby power source, and based on determining all these conditions are satisfied, a switch-on implementation signal is sent to the networking recovery breaker;
   Step 7: after an interconnection of the power grid is restored, disconnecting an over-current networking recovery breaker or decreasing a current by using a current limiting reactor;
   Step 8: uncoupling existing high and low voltage electromagnetic ring network; and
   Step 9: resetting a fast reconfiguration system of power supply network comprising: after finishing step 8 for 200 ms, resetting all devices of the fast reconfiguration system of power supply network, and returning to step 1 to monitor a next power grid disconnection event.

2. The method of claim 1, wherein in the step 1, for information acquisition and transmission of the fast reconfiguration master station and the fast reconfiguration client stations, the step comprises:
   S2-1) acquiring electrical measurements of a substation or a plant in a fast reconfiguration client substation using hardwiring;
   S2-2) transmitting through a network communication the information and instructions between the fast reconfiguration master station and the fast reconfiguration client station;
   S2-3) setting a sampling rate of power frequency recording data of the fast reconfiguration substation equal to or greater than 1200 Hz;
   S2-4) setting a data processing period of the fast reconfiguration client station to equal to or less than 0.83 ms;
   S2-5) setting an information transmission period and instruction scanning period between the fast reconfiguration master station and the fast reconfiguration client station to equal to or less than 1.67 ms;
   S2-6) switching value inputs or digital inputs acquired by the fast reconfiguration client stations in transformer substations or power plants include: breaker position, trip signal of relay protection devices and trip signal of stability control devices;
   S2-7) analog inputs acquired by the fast reconfiguration client stations in the transformer substations or power plants includes voltages of critical buses, currents and voltages of branches of external power sources, transformers, generators, tie lines and bus couplers.

3. The method of claim 1, wherein in the step 1, in the master station, determining that there is or will be a fault of causing the breaker to open according to acquired power grid information, and wherein the fault includes:
   S3-1) short circuit fault;
   S3-2) over current fault;
   S3-3) power or voltage oscillation;
   S3-4) Remote disconnection of external network to form isolated network;
   Among them, the short circuit fault, the over current fault, the power or voltage oscillation fault triggers devices other than a fast reconfiguration system of power supply network to disconnect the corresponding class I breaker, which causes the power grid to be separated and form an electrical island, after being separated, an island power grid without an original fault appears, and wherein the devices other than the fast reconfiguration system of the power supply network include relay protection devices and power grid stability control devices;
   based on determining that a remote separation of the external network forms an isolated network, the fast reconfiguration system of power supply network actively disconnects the monitored power grid and the external network at the tie line breaker corresponding to the class II breaker, and the monitored power grid forms a new isolated electrical island.

4. The method of claim 1, wherein in the step 2, detecting the preset fault comprising:
S4-1) the master station of fast reconfiguration evaluates voltages of all buses of the monitored power grid in real time, based on determining that a lowest bus voltage is lower than a first voltage threshold and lasts for a time period longer than a first time threshold, a bus corresponding to the lowest bus voltage is selected as a fault bus, wherein the first voltage threshold is set to 0.5 times a rated voltage, and the first time threshold is set to 10 ms;
S4-2) according to a current of each branch connected to the fault bus, a branch with a largest current is selected as a fault branch, and the breaker close to the fault bus on the fault branch is selected as the class I breaker;
S4-3) in response to determining that the fault occurs at the fault bus, determining the class I breaker using step of S4-2).

5. The method of claim 1, wherein in the step 2 and 3, the networking recovery breaker has following characteristics:
S5-1) The networking recovery breaker reconnects an isolated power grid with other power grids through a switch-on operation;
S5-2) After the networking recovery breaker is switched on, an overcurrent protection is not triggered to act in a time period of a second time threshold, wherein the second time threshold is set to 20 s;
S5-3) based on determining that there are more than one networking recovery breakers for an electrical island formed by the class I or class II breaker and these networking recovery breakers belong to three or more voltage levels, only networking recovery breakers at highest two voltage levels are reserved;
S5-4) Each networking recovery breaker belongs to a fast reconfiguration client station, and the instructions sent by the master station to the networking recovery breaker are forwarded by the fast reconfiguration client station.

6. The method of claim 1, wherein in the step 3, determining that an external grid has been isolated and has been collapsing based on determining that all of the following criteria are met simultaneously:
S6-1) a frequency deviation of a bus connected by a tie line of the external grid from a rated frequency exceeds a first frequency deviation threshold, wherein the first frequency deviation threshold is set to 0.1 Hz;
S6-2) The frequency deviation between the bus connected by the tie line of the external power grid and a bus of a standby power source exceeds a second frequency deviation threshold, wherein the second frequency deviation threshold is set to 0.2 Hz;
S6-3) a frequency of the standby power bus is within a first frequency range, wherein the first frequency range is set to 49 Hz~51 Hz;
S6-4) a frequency change rate of the bus connected by the tie line of the external power grid exceeds a first frequency change rate threshold, wherein the first frequency change rate threshold is set to 0.2 Hz/s;
S6-5) a duration is greater than a time period of a third time threshold, wherein the third time threshold is set to 150 ms.

7. The method of claim 1, wherein in the step 2, based on determining that the master station of fast reconfiguration detects an occurrence of the preset fault, the master station sends the pre-start switch-on instructions to the client stations where the networking recovery breakers are located before the class I breaker is switched off due to the preset fault.

8. The method of claim 1, wherein in the step 3, based on determining that the master station of fast reconfiguration detects that the external network has been isolated and has been collapsing, the master station sends following instructions:
S8-1) sending a switch-off signal to the tie breaker of the external network;
S8-2) after a delay of 5 ms, sending the instructions of synchronous switch-on to the client stations where the networking recovery breakers corresponding to the class II breaker are located.

9. The method of claim 1, wherein in the step 4, according to the local measurement information, when one of the client stations of fast reconfiguration receiving the pre-start switch-on instructions identifies that the fault is cleared or is being cleared, the client station sends the instructions of synchronous switch-on to the networking recovery breakers in a station where the client station of fast reconfiguration is located.

10. The method of claim 1, wherein in the step 4, the client station receiving the pre-start switch-on instruction identifies that the fault is cleared or is being cleared based on:
S10-1) the client station of fast reconfiguration is in a same power substation or plant as the class I breaker, the client station directly receives a trip signal of the class I breaker through hardwiring, upon receiving the trip signal, the client station of fast reconfiguration immediately sends the instructions of synchronous switch-on to the networking recovery breaker corresponding to the class I breaker;
S10-2) the client station of fast reconfiguration is in the same power substation or plant as the class I breaker, the client station of fast reconfiguration directly receives the trip signal sent by a relay protection device or stability control device related to the class I breaker through hardwiring; when the trip signal is received, the client station of fast reconfiguration delays a time period of a fourth time threshold to send the instruction of synchronous switch-on to the networking recovery breaker corresponding to the class I breaker, wherein the fourth time threshold is set to 5 ms;
510-3) based on determining that the client station of fast reconfiguration is not in the same power substation or plant as the class I breaker, the client station of fast reconfiguration determines a time when the fault is cleared by monitoring a voltage status at both ends of the breaker receiving the pre-start switch-on instruction in the substation or plant; based on determining that the fault is cleared, the client station of fast reconfiguration immediately sends the instruction of synchronous switch-on to the networking recovery breaker corresponding to the class I breaker.

11. The method of claim 10, wherein in the S10-3, the client station of fast reconfiguration identifying the time when the fault is cleared further comprises:
S11-1) a bus voltage Uy at a lower side of two buses connected by the breaker receiving the pre-start switch-on instruction is monitored in real time by client station of fast reconfiguration;
S11-2) based on determining that the Uy is greater than 0.9 times of a rated voltage or the Uy rises more than 0.1 times of the rated voltage within 20 ms, determining that the fault is cleared and recording a corresponding time as the time when the fault is cleared.

12. The method of claim 1, wherein in the step 5, the master station of fast reconfiguration monitoring a switch-off of the class I breaker and sending the instructions of synchronous switch-on to the client stations comprises:
   S12-1) In a scope of the monitored power grid, through a communication network, the master station of fast reconfiguration receives in real time from the client station of fast reconfiguration a switch-off signal of the class I breaker, or a switch-off signal of a relay protection device or a stability control device associated with the class I breaker;
   S12-2) In a scope of the power substation or plant where the master station of fast reconfiguration is located, through hardwiring, the master station of fast reconfiguration receives in real time the switch-off signal of the class I breaker or the switch-off signal of the relay protection device or the stability control device associated with the class I breaker in the same power substation or plant;
   S12-3) based on determining that the master station of fast reconfiguration detects a disconnection of the class I breaker, the master station immediately sends the instructions of synchronous switch-on to the client stations of fast reconfiguration where the networking recovery breakers corresponding to the class I breaker are located through the communication network, wherein the networking recovery breakers belong to different client stations of fast reconfiguration or power substations or plants;
   S12-4) based on determining that the master station of fast reconfiguration detects that a relay protection device or a stability control device sends the switch-off signal to the class I breaker, the master station delays the time period of the fourth time threshold to send the instructions of synchronous switch-on to the client stations of fast reconfiguration where the networking recovery breakers corresponding to the class I breaker are located through the communication network, wherein the networking recovery breakers belong to different client stations of fast reconfiguration or power substation or plant;
   S12-5) based on determining that the client station of fast reconfiguration has sent out the instruction of synchronous switch-on and the instruction has been executed, the instruction of synchronous switch-on from the master station of fast reconfiguration is ignored; otherwise, the instruction of synchronous switch-on from the master station of fast reconfiguration is executed, wherein the instruction of synchronous switch-on from the master station of fast reconfiguration is a backup of the instructions of synchronous switch-on from the client station of fast reconfiguration.

13. The method of claim 1, wherein in the step 4 and 5, based on determining that that the class I breaker has been switched off, the instructions of synchronous switch-on are sent to the corresponding networking recovery breakers within a period of less than or equal to 5 ms from a time when the client station of fast reconfiguration or the master station of fast reconfiguration receives the switch-off signal of the class I breaker.

14. The method of claim 1, wherein the step 6 comprises sending the switch-on implementation signal to the networking recovery breaker in response to the client station of fast reconfiguration determining that the networking recovery breaker meets the synchronous switch-on condition, no fault blocking in the power outage area, and no fault blocking in the area of standby power source.

15. The method of claim 14, wherein the synchronous switch-on condition comprises:
   S15-1) an angle difference between two voltage phasors at the two sides of the networking recovery breaker less than 20°;
   S15-2) a frequency difference between the two sides of the networking recovery breaker less than 1 Hz;
   S15-3) a voltage amplitude difference between the two sides of the networking recovery breaker less than 0.2 times of a rated voltage.

16. The method of claim 14, wherein in the step 6, fault blocking in the power outage area is set to true based on determining that one of following conditions is satisfied:
   S16-1) three phase voltages of a bus are less than 0.7 times of a rated voltage in the power outage area; or
   S16-2) a difference between a maximum voltage amplitude and a minimum voltage amplitude among the three phase voltages is greater than 30% of the rated voltage in the power outage area.

17. The method of claim 14, wherein in the step 6, fault blocking in the area of standby power source is set to true based on determining that a node voltage and a frequency of the networking recovery breaker on a side of the standby power source meet any of following conditions:
   S17-1) a phase voltage is outside a range of 0.85~1.2 times of a rated value; or
   S17-2) a frequency is outside a range of 49.2 Hz~50.8 Hz.

18. The method of claim 1, wherein in the step 7, the disconnecting the over-current networking breaker or decreasing the current comprises: based on determining that the current after the networking breaker is switched on exceeds a current threshold and lasts for a time period more than a fifth time threshold, switching off the networking breaker or triggering a corresponding fast breaker to enter a high impedance state, wherein the fifth time threshold is set to 100 ms.

19. The method of claim 1, wherein in the step 8, the uncoupling the existing high and low voltage electromagnetic ring network comprises:
   19-1) After the switch-on implementation signal is sent out in the step 6, based on determining that the class I breaker or the class II breaker is still in a closing state and lasts for a time period of a sixth time threshold, sending a switch-off signal to the class I breaker or the class II breaker, wherein the sixth time threshold is set to 150 ms;
   19-2) After the switch-on implementation signal is sent out in the step 6, based on determining that a networking recovery breaker at a higher voltage level is in a success state of switch-on and lasts for the time period of the sixth time threshold, sending the switch-off signal to all networking recovery breakers with the success state of switch-on at lower voltage levels.

20. The method of claim 1, wherein based on determining that a grid is separated, reconnecting an isolated part of the separated grid to a grid with a standby power source within a period of 150 ms.

* * * * *